(12) United States Patent
Thoma

(10) Patent No.: US 7,951,747 B1
(45) Date of Patent: May 31, 2011

(54) SINGLE-LAYER TRANSITION METAL SULFIDE CATALYSTS

(75) Inventor: Steven G. Thoma, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 193 days.

(21) Appl. No.: 12/417,687

(22) Filed: Apr. 3, 2009

(51) Int. Cl.
*B01J 27/051* (2006.01)
*B01J 27/049* (2006.01)
*B01J 27/043* (2006.01)
*B01J 37/00* (2006.01)
*B01J 31/00* (2006.01)
*C08F 4/02* (2006.01)
*C08F 4/60* (2006.01)

(52) U.S. Cl. ......... 502/220; 502/152; 502/221; 502/222

(58) Field of Classification Search .................. 502/152, 502/220–222
See application file for complete search history.

(56) References Cited

U.S. PATENT DOCUMENTS

| 4,606,809 | A | | 8/1986 | Garg et al. |
|---|---|---|---|---|
| 5,460,714 | A | * | 10/1995 | Fixari et al. ................. 208/112 |
| 5,578,197 | A | | 11/1996 | Cyr et al. |
| 5,622,616 | A | | 4/1997 | Porter et al. |
| 6,245,200 | B1 | | 6/2001 | Wilcoxon |
| 7,396,865 | B2 | * | 7/2008 | Tsuji et al. ....................... 524/87 |
| 7,678,730 | B2 | * | 3/2010 | Mironov et al. .............. 502/200 |
| 7,678,731 | B2 | * | 3/2010 | Mironov et al. .............. 502/200 |
| 7,737,073 | B2 | * | 6/2010 | Mironov et al. .............. 502/200 |

OTHER PUBLICATIONS

Zhi Jun Zhang, Jun Zhang, and Qun Ji Xue, Synthesis and Characterization of a Molybdenum Disulfide Nanocluster, J. Phys. Chem., 1994, 98 (49), 12973-12977 DOI: 10.1021/j100100a027 Publication Date (Web): May 1, 2002.
Russell R. Chianelli, Mohammad H. Siadati, & Myriam Perez De La Rosa, Catalytic Properties of Single Layers of Transition Metal Sulfide Catalytic Materials, Catalysis Reviews, 48:1-41, 2006 Copyright Taylor & Francis Group, LLC, ISSN: 0161-4940 print 1520-5703 online DOI: 10.1080/0161494050043776, Sep. 2005.
Russell R. Chianelli, Gilles Berhault & Brenda Torres, Unsupported Transition Metal Sulfide Catalysts: 100 Years of Science and Application, Catalysis Today, journal homepage: 222.elsevier.com/locate/cattod.
Steven Thoma, Nanosize Semiconductors for Photooxidation, ISSN10408436, vol. 30/No. 3/Jul.-Sep. 2005, 153-182.

* cited by examiner

*Primary Examiner* — Patricia L Hailey
(74) *Attorney, Agent, or Firm* — Olivia J. Tsai

(57) ABSTRACT

Transition Metal Sulfides (TMS), such as molybdenum disulfide ($MoS_2$), are the petroleum industry's "workhorse" catalysts for upgrading heavy petroleum feedstocks and removing sulfur, nitrogen and other pollutants from fuels. We have developed an improved synthesis technique to produce SLTMS catalysts, such as molybdenum disulfide, with potentially greater activity and specificity than those currently available. Applications for this technology include heavy feed upgrading, in-situ catalysis, bio-fuel conversion and coal liquefaction.

24 Claims, 4 Drawing Sheets

SINGLE-LAYER TRANSITION METAL SULFIDE CATALYSTS

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

Transition Metal Sulfides (TMS), such as molybdenum disulfide ($MoS_2$), are the petroleum industry's "workhorse" catalysts for upgrading heavy petroleum feedstocks, and for removing sulfur, nitrogen and other pollutants from fuels. TMS $MoS_2$ exists in single layer sheets of sulfur-molybdenum-sulfur atoms. Catalytic sites with different functions occur at the edges as well as the junction of edges and the basal planes of these sheets. Decreasing catalyst particle size increases the number of active sites per mass and also increases the proximity of the various sites, which is extremely important to both catalyst selectivity (making specific chemical products from feedstock) and catalyst activity (catalyst performance and reaction yield). Further, quantum confinement effects have been shown to dramatically enhance the catalytic activity of nanoscale TMS catalysts in some applications.

Major industrial reactions catalyzed by Transition Metal Sulfides include:
  Petroleum processing, including transformation of low-value crude/petroleum-processing-by-products into product (hydrogenation; hydrodesulfurization; hydrodenitrogenation; hydrodemetallization, hydrocracking; dealkylation; reforming; isomerization of paraffins; etc);
  Direct coal liquefaction;
  Hydrogen generation: energetically favorable $H_2O$ & $H_2S$ splitting (photo-oxidation); and
  Bio-fuel production: energy-efficient alcohol synthesis from bio-feedstocks via greater catalytic alkali promotion selectivity.

The ability to control TMS catalyst growth and structure is therefore fundamental to enhancing and controlling catalyst function for specific applications. The ultimate reduction in TMS scale results in Single Layer TMS materials (SLTMS).

SUMMARY OF THE INVENTION

We have developed an improved synthesis technique to produce single layer transition metal sulfide catalysts (SLTMS) such as molybdenum disulfide ($MoS_2$). This method refers specifically to single and combined elements of rows 4, 5, and 6 from the period chart of the elements with sulfur, selenium and/or tellurium. For example, by this method one can synthesize TMS catalyst $MoS_2$ or TMS catalyst combined with a suitable promoter element to produce $Mo_xM_yS_2$ where M=Ni, Fe, or Co and x+y=nominally one. Further, by this method one can directly synthesize TMS catalyst $MoS_2$ in the distorted octahedral structure. The synthesized product can be chemically stabilized via addition of alkylthiols, alkylamines, or alkylphosphines. The synthesized product is suitable for use as an unsupported catalyst or may be deposited onto a support.

Applications for this technology include heavy feed upgrading, in-situ catalysis, bio-fuel conversion and coal liquefaction.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

An improved method of synthesizing Transition Metal Sulfides (TMS) has been developed that enables synthesis of primarily Single Layer TMS materials (SLTMS), such as nanoscale $MoS_2$. The synthesis is room temperature (low energy), uses low cost industrially available precursors, and is readily scalable. Physical and chemical characterization suggest that this improved method produces the smallest and most uniform Single Layer TMS materials (SLTMS) reported.

The structure of $MoS_2$ consists of trigonal prisms of sulfur coordinated to Mo that are strongly bonded in two dimensions, creating S—Mo—S layers that stack to form three dimensional crystals with either a hexagonal or rhombohedral structure. If, however, within this structure the Mo is reduced to Mo(III), then a distorted octahedral structure (with respect to the Mo) results. Stacking of the single layers occurs in several polytypes that reflect different repeat units in the third dimension. Catalytic activity from pure $MoS_2$ catalysts is derived primarily from catalytically-active rim or edge sites where 'rim' refers to sites at the edge of exterior layers with adjacent basal planes exposed to the reacting environment; 'edge' refers sites on at the edges of exterior layers not adjacent to exposed basal planes.

Hydrogenation and desulfurization occurs at rim sites, whereas only desulfurization occurs at edge sites. Hence, total catalytic activity increases as a function of the number of rim and edge sites per catalyst mass, which scales inversely with catalyst particle size. Catalytic selectivity is a strong function of the relative proportion of the rim and edge sites, which is also a function of catalyst particle size, multilayer versus single layer, etc.

The present method is a 'bottom-up' synthesis, versus the typical 'top-down' synthesis. We've shown that we can alter the size/structural/electronic properties by slight variations in the syntheses. This synthetic method enables combining of support/stabilization and promotion into one material system and at and below the quantum confinement size scale. Further, TMS catalysts such as $MoS_2$ can be synthesized directly in the distorted octahedral structure.

Figure 1:
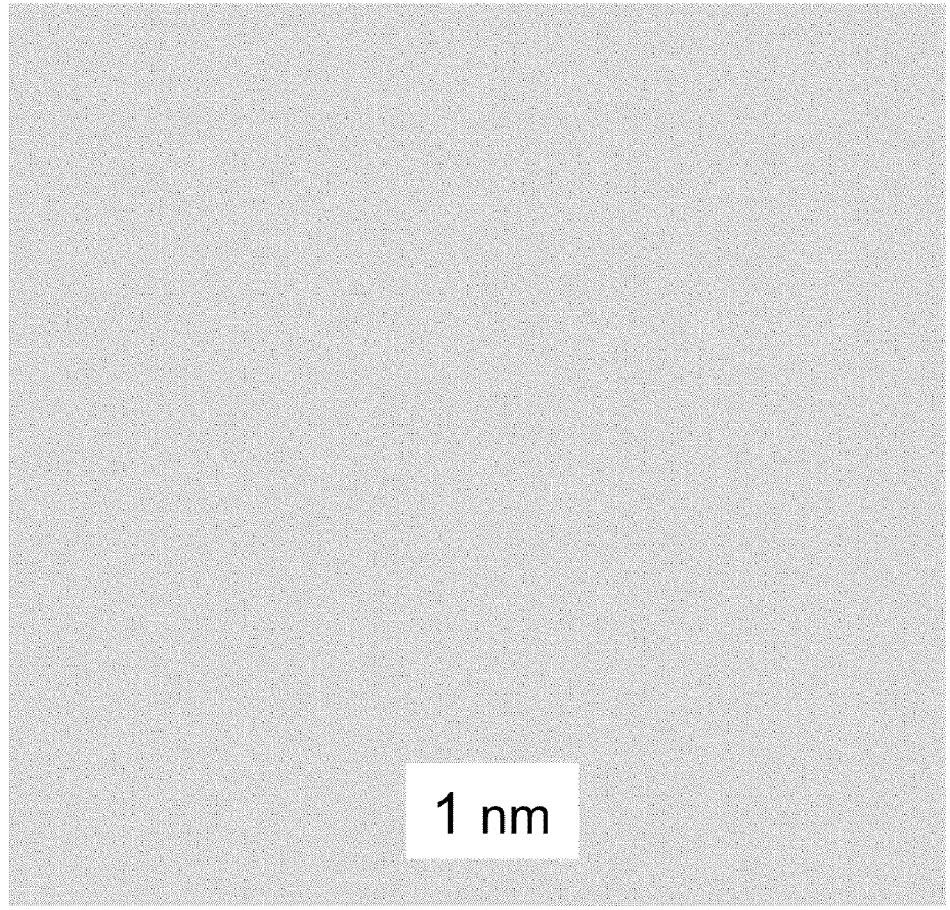
FIG. 1 TEM of SLTMS $MoS_2$ catalyst
Figure 2:
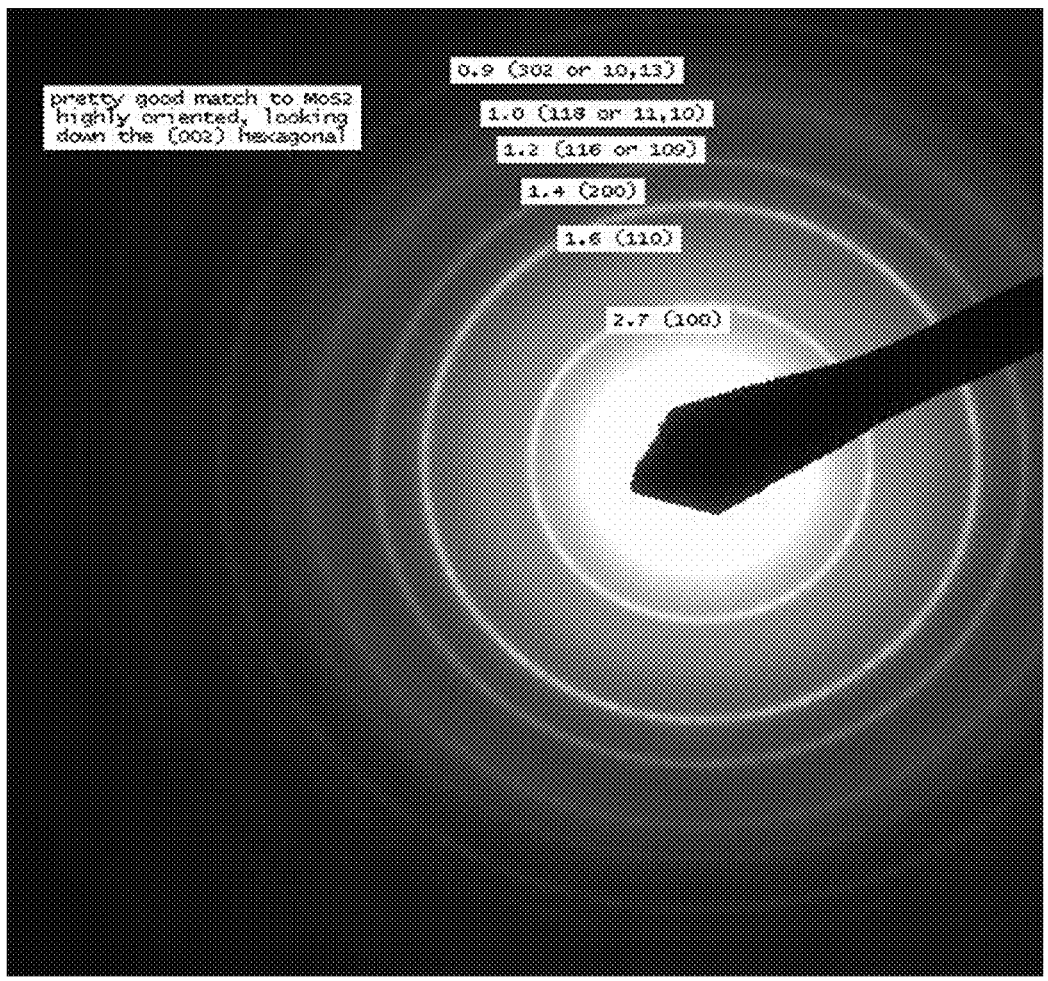
FIG. 2 Electron diffraction pattern of distorted octahedral SLTMS $MoS_2$ catalyst FIG. 3 Optical absorption spectra of SLTMS $MoS_2$ catalyst FIG. 4 Optical absorption spectra of alternate synthesis $MoS_2$ SLTMS catalyst
Figure 3:
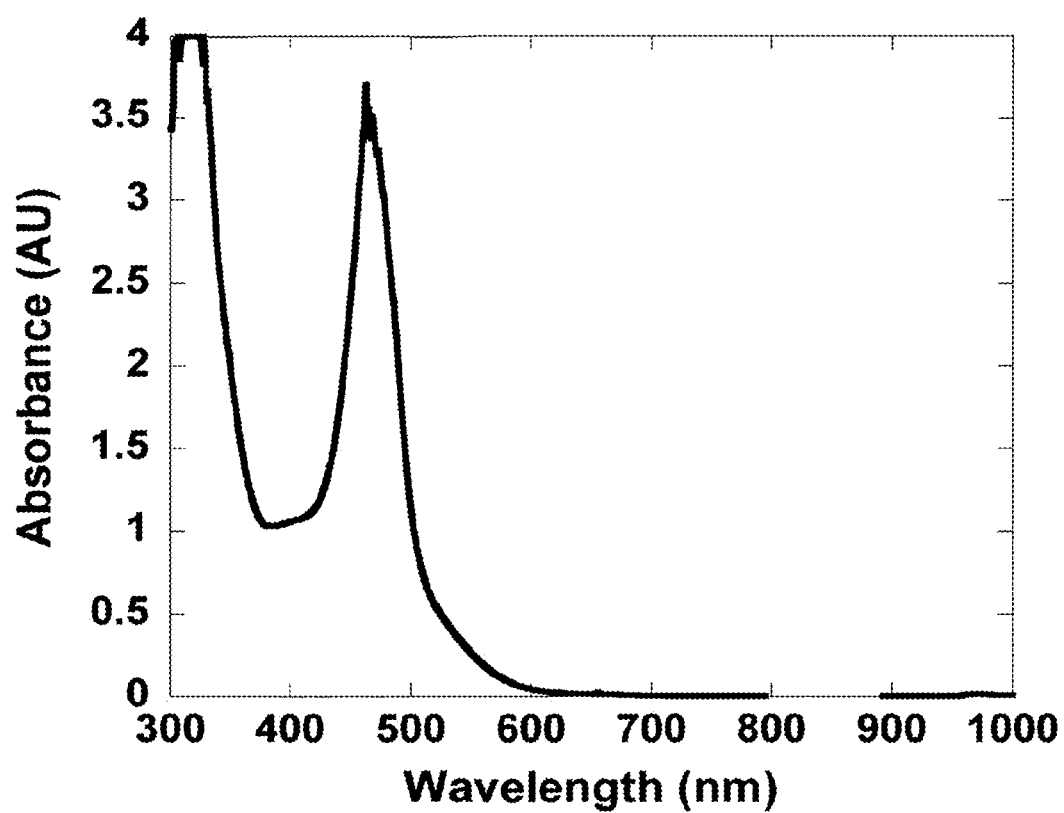

Results:

Transmission electron microscopy (TEM) (see FIG. 1) of nano-$MoS_2$ prepared according to the methods of the present invention, and electron diffraction pattern (see FIG. 2) support the nanoscale distorted octahedral $MoS_2$ morphology. Dynamic light scattering (DLS) data indicates an average particle diameter of 1.4 nm. The data exhibits a single exponential decay and the autocorrelation function is linear over two decades, indicating a very monodisperse system. The DLS determined hydrodynamic radius typically exceeds the observed TEM particle size because of adsorbed organic species. Sharp features (sharp peaks at about 315 and 460 nm) in the optical absorption spectrum (FIG. 3) also suggest a monodisperse system.

The Fourier Transform Raman spectra of the bulk sample show that the main features are located at 153 cm$^{-1}$ and 222 cm$^{-1}$, which indicate that the sample contains single layer $MoS_2$. Raman microprobe examination of several positions further supports this determination. Also, the absence of a Raman mode at 383 cm$^{-1}$ suggests that the sample exhibits a distorted octahedral structure. The only other Raman modes are located at 430 cm$^{-1}$ and 471 cm$^{-1}$ and are associated with Mo—S bonding (symmetric vibration). There was no significant overlap between product and precursor/solvent modes. The original synthesis has been reproduced many times, as well as scaled up by a factor of three, without significant variation of the product.

Figure 4:
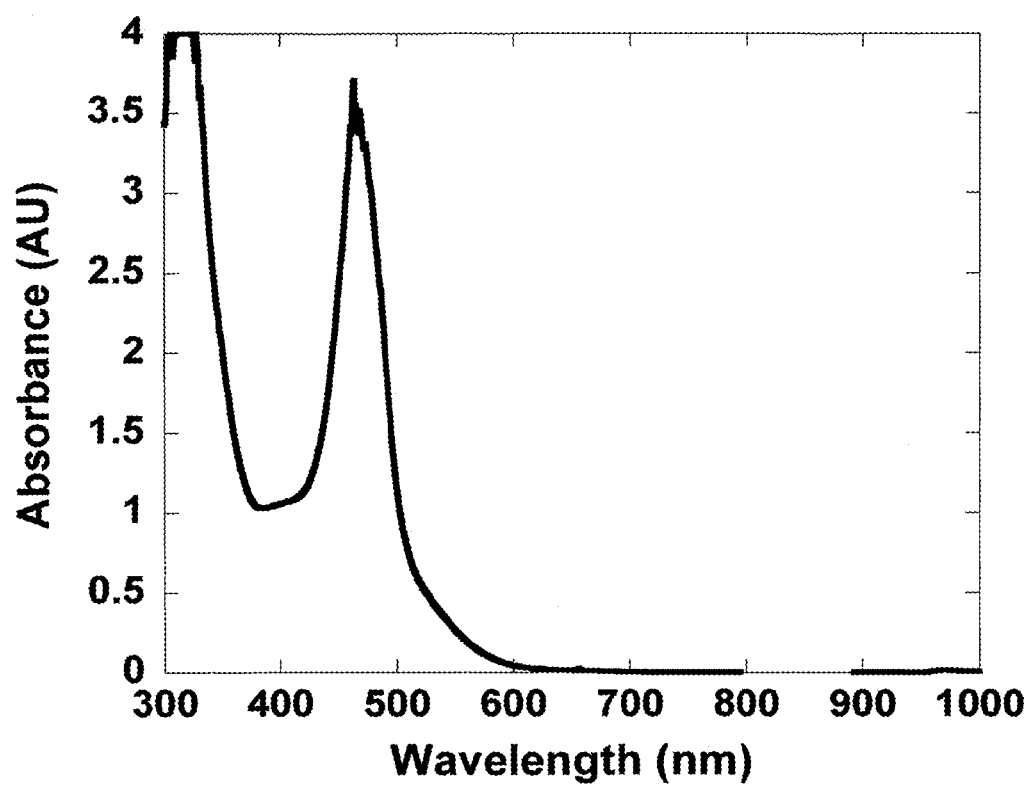

Slight alterations to the synthesis method (and thereby reproducibly) have made nanoscale TMS materials with different physical and chemical properties. FIG. 4 shows the optical absorption spectra of a synthetic variation (versus the data presented above), indicating sharp peaks at about 330 and 400 nm. DLS indicates an average particle diameter of approximately 1.8 nm for this sample (also very monodisperse), which clearly has different optical properties.

The UV-VIS data support different structure & electronic properties. The present synthesis methods do not need additional stabilizing ligands; and this approach is not based on a micellular system. Additional stabilizing ligands may be added to enable atmospheric processing, e.g. inhibit oxidation, or increase the temporal stability of the product until it arrives at its point of use. By using the present approach, catalysts can be made with specific, uniform structural/electronic (and therefore) catalytic properties. The product can be concentrated by solvent removal approximately 50×, and redispersed again (in toluene) without altering the $MoS_2$.

Numerous recipes have been developed that lead to nano-sized molybdenum disulfide ($MoS_2$) with different optical, and therefore structural/electronic, properties. Product yields are typically 50-90%. Representative samples are (reagents are added at room temperature with stirring into the constituent solvent):

Example 1

0.00035 M molybdenum ethylhexanoate; and
0.00027 M 2-ethylhexanoic acid; and
0.01 M lithium sulfide.
In an inert atmosphere glovebox:
  A starting solution of 1.40 M molybdenum ethylhexanoate in 2-ethylhexanoic acid is diluted 1:100 in toluene.
  0.125 ml of this solution is added with stirring to 3.875 ml toluene.
  1.000 ml of a 0.05 M lithium sulfide in methanol solution is added dropwise with stirring.
  The solution is allowed to stand overnight minimum, and then filtered through a 0.22 micron teflon syringe filter.
Dynamic light scattering indicates monodisperse 1.6 nm diameter particles.

Example 2

0.00035 M molybdenum ethylhexanoate; and
0.00027 M 2-ethylhexanoic acid; and
0.01 M lithium sulfide; and
0.01 M lithium borohydride
In an inert atmosphere glovebox:
  A starting solution of 1.40 M molybdenum ethylhexanoate in 2-ethylhexanoic acid is diluted 1:100 in toluene.
  0.125 ml of this solution is added with stirring to 3.850 ml toluene.
  1.000 ml of a 0.05 M lithium sulfide in methanol solution is added dropwise with stirring.
  0.025 ml of a 2.0M Lithium borohydride in tetrahydrofuran solution is added dropwise with stirring
  The solution is allowed to stand overnight minimum, and then filtered through a 0.22 micron teflon syringe filter.
Dynamic light scattering indicates monodisperse 2.6 nm diameter particles.

Example 3

0.00035 M molybdenum ethylhexanoate; and
0.00027 M 2-ethylhexanoic acid; and
0.01 M lithium sulfide; and
0.01 M dodecanethiol
In an inert atmosphere glovebox:
  A starting solution of 1.752 M molybdenum ethylhexanoate in 2-ethylhexanoic acid is diluted 1:100 in toluene.
  0.125 ml of this solution is added with stirring to 3.875 ml of a solution of 0.01M dodecanethiol in toluene.
  1.000 ml of a 0.05 M lithium sulfide in methanol solution is added dropwise with stirring.
  The solution is allowed to stand overnight minimum, and then filtered through a 0.22 micron teflon syringe filter.
Dynamic light scattering indicates 2.1 nm diameter particles.

Example 4

0.0014 M molybdenum ethylhexanoate; and
0.0010 M cobalt ethylhexanoate; and
0.0011 M 2-ethylhexanoic acid; and
0.01 M lithium sulfide; and
In an inert atmosphere glovebox:
  A starting solution of 1.40 M molybdenum ethylhexanoate in 2-ethylhexanoic acid is diluted 1:100 in toluene.
  0.50 ml of this solution is added with stirring to 3.45 ml toluene.
  A solution that is 0.1M cobalt ethylhexanoate in toluene/mineral spirits is prepared by diluting a 47 wt % cobalt ethylhexanoate in mineral spirits solution with toluene.
  0.05 ml of this solution is added with stirring to the molybdenum ethylhexanoate-toluene solution.
  1.000 ml of a 0.05 M lithium sulfide in methanol solution is added dropwise with stirring.
  The solution is allowed to stand overnight minimum, and then filtered through a 0.22 micron teflon syringe filter.
Dynamic light scattering indicates monodisperse 1.3 nm diameter particles.

Example 5

0.0014 M molybdenum ethylhexanoate; and
0.0010 M nickel ethylhexanoate; and
0.0011 M 2-ethylhexanoic acid; and
0.01 M lithium sulfide; and
In an inert atmosphere glovebox:
  A starting solution of 1.40 M molybdenum ethylhexanoate in 2-ethylhexanoic acid is diluted 1:100 in toluene.

0.50 ml of this solution is added with stirring to 3.00 ml toluene.

0.50 ml of 0.01M nickel ethylhexanoate in 10 vol % ethylhexanoic acid/90 vol % toluene is added with stirring.

1.000 ml of a 0.05 M lithium sulfide in methanol solution is added dropwise with stirring.

The solution is allowed to stand overnight minimum, and then filtered through a 0.22 micron teflon syringe filter.

Dynamic light scattering indicates monodisperse 2.4 nm diameter particles.

General Method

Based on these specific examples, a general method for synthesizing nanoscale particles of molybdenum disulfide was developed. The general method comprises mixing the following reagents, dispersed in suitable organic solvents, to the listed final concentrations, in an oxygen and moisture free environment with stirring:

0.0001-0.1 M molybdenum ethylhexanoate;
0.0001-0.1 M 2-ethylhexanoic acid; and
0.0001-0.1 M lithium sulfide.

Alternatively, the lithium sulfide ingredient can be replaced by lithium selenide or lithium telluride, using chemically equivalent amounts of selenium or tellurium with respect to sulfur. In these cases, the nanoscale particles comprise molybdenum diselenide particles or molybdenum ditelluride, respectively.

Optionally, 0.0001-0.1 M cobalt ethylhexanoate can be added to the general method, which produces mixed-metal nanoscale particles. Optionally, the cobalt ethylhexanoate can be replaced by either another organocobalt compound such as cobalt napthenate; an inorganic salt such as cobalt chloride or cobalt bromide or dicobalt octacarbonyl using chemically equivalent amounts of the substituted compounds with respect to sulfur. Alternatively, the cobalt can be replaced by the analogous organometallic nickel or iron compounds such as nickel or iron ethylhexanoate or naphthenate or inorganic salts such as nickel or iron chloride (or nickel or iron bromide) in amounts such that there is a chemical equivalence between cobalt and either nickel or iron.

Optionally, an alkyl thiol such as dodecanethiol can be added at a final solution concentration of 0.0001-0.1 M. The alkyl thiol is added prior to addition of lithium sulfide, selenide, or telluride.

Optionally, an alkyl compound such as hexadecylamine or trioctylphosphine sulfide or trioctylphosphine oxide can be added at a final solution concentration of 0.0001-0.1 M. The alkyl amine is added prior to addition of lithium sulfide, selenide, or telluride.

Optionally, a reducing compound such as lithium borohydride or lithium aluminum hydride can be added at a final solution concentration of 0.001-0.1M. The reducing compound is added following addition of lithium sulfide, selenide, or telluride.

The post-synthesis solution can be concentrated by solvent removal using standard methods (e.g. filtering). Also, the method can be performed at room temperature. Finally, the method can be performed without the use of stabilizing surfactant additives.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

The invention claimed is:

1. A method of synthesizing nanoscale particles of molybdenum disulfide, comprising mixing the following reagents to form a mixture, dispersed in one or more organic solvents, to the listed final concentrations, in an oxygen and moisture free environment with stirring:

0.0001-0.1 M molybdenum ethylhexanoate;
0.0001-0.1 M 2-ethylhexanoic acid; and
0.0001-0.1 M lithium sulfide.

2. The method of claim 1, additionally comprising adding 0.0001-0.1 M of a cobalt compound to the mixture, wherein the cobalt compound is selected from the group consisting of cobalt 2-ethylhexanoate, cobalt naphthenate, cobalt chloride, dicobalt octacarbonyl, and cobalt bromide.

3. The method of claim 2 wherein the cobalt compound is cobalt 2-ethylhexanoate.

4. The method of claim 1, additionally comprising adding 0.0001-0.1 M of a nickel compound to the mixture, wherein the nickel compound is selected from the group consisting of nickel 2-ethylhexanoate, nickel naphthenate, nickel chloride, and nickel bromide.

5. The method of claim 1, additionally comprising adding 0.0001-0.1 M of an iron compound to the mixture, wherein the iron compound is selected from the group consisting of iron 2-ethylhexanoate, iron naphthenate, iron chloride, and iron bromide.

6. The method of claim 1, additionally comprising adding 0.0001-0.1 M of an alkyl compound to the mixture.

7. The method of claim 6, wherein the alkyl compound is an alkyl thiol.

8. The method of claim 7, wherein the alkyl thiol is dodecanethiol.

9. The method of claim 6, wherein the alkyl compound is an alkyl amine.

10. The method of claim 9, wherein the alkyl amine is hexadecylamine.

11. The method of claim 6, wherein the alkyl compound is trioctylphosphine sulfide or trioctylphosphine oxide.

12. The method of claim 1, additionally comprising adding 0.0001-0.1M of lithium borohydride or lithium aluminum hydride to the mixture.

13. The method of claim 12, wherein the lithium borohydride or lithium aluminum hydride is initially dispersed in tetrahydrofuran.

14. The method of claim 1, wherein the one or more organic solvents comprises toluene.

15. The method of claim 1, wherein the method does not use stabilizing surfactants for synthesizing the nanoscale particles.

16. The method of claim 1, wherein the molybdenum ethylhexanoate is initially dispersed in the 2-ethylhexanoic acid before being combined with the lithium sulfide.

17. The method of claim 1, wherein the lithium sulfide is initially dispersed in methanol before being combined with the molybdenum ethylhexanoate.

18. The method of claim 17, comprising, in the order presented:
a) providing a starting solution of molybdenum ethylhexanoate in 2-ethylhexanoic acid;
b) diluting the starting solution in toluene;
c) adding the lithium sulfide dispersed in methanol dropwise to the toluene-diluted solution, with stirring;
d) letting stand overnight; and
e) filtering to separate out the nanoscale particles of molybdenum disulfide.

19. The method claim 1, wherein the method is performed at room temperature.

20. The method of claim 1, further comprising filtering the mixture after reacting to separate out the nanoscale particles of molybdenum disulfide.

21. A method of synthesizing nanoscale particles of molybdenum disulfide, comprising mixing the following reagents, dispersed in one or more organic solvents, to the listed final concentrations, in an oxygen and moisture free environment with stirring:

0.00035 M molybdenum ethylhexanoate;

0.00027 M 2-ethylhexanoic acid; and 0.01 M lithium sulfide.

22. The method of claim 21, further comprising adding 0.01 M lithium borohydride.

23. The method of claim 21, further comprising adding 0.01 M dodecanethiol.

24. A method of synthesizing mixed-metal nanoscale particles of, comprising mixing the following reagents, dispersed in one or more organic solvents, to the listed final concentrations, in an oxygen and moisture free environment with stirring:

0.0014 M molybdenum ethylhexanoate;

0.0010 M nickel or cobalt ethylhexanoate;

0.0011 M 2-ethylhexanoic acid; and 0.01 M lithium sulfide.

* * * * *